Patented Aug. 27, 1940

2,212,536

UNITED STATES PATENT OFFICE 2,212,536

INSECTICIDAL COMPOSITION

Edgar C. Britton, Gerald H. Coleman, and John W. Zemba, Midland, Mich., assignors to The Dow Chemical Company, Midland, Mich., a corporation of Michigan No Drawing. Application August 24, 1939, Serial No. 291,738

9 Claims. (Cl. 167—30)

This invention concerns insecticidal spray compositions particularly adapted for combating flies, mosquitoes, and similar insects.

Extracts of such insecticidal plant products as pyrethrum flowers, derris, cubé, timbo, barbasco, and the like are widely used for the control of insect pests. These toxicants are generally employed in petroleum distillate sprays or in water dispersions. Pyrethrin-containing sprays have a quick paralyzing action on flies and the like, but give a relatively low kill as compared to the per cent knockdown. With rotenone-containing compositions a high "moribund" kill is generally obtained, although a considerable period of time is required to destroy insect pests. The plant extracts generally are unstable to heat and light and lose their effectiveness to a considerable degree upon storage.

We have discovered that aryloxy-polyalkylene ether iodides are effective substitutes for extracts of insecticidal plant products in spray compositions. Solutions of such synthetic ether compounds compare favorably in toxic effect with the plant extracts and have the added advantage of being substantially colorless and odorless and more stable to heat, light, and air than are pyrethrin and rotenone. Furthermore, small amounts of these ethers may be added to solutions and dispersions of insecticidal plant products containing such toxic principles as pyrethrin and rotenone to obtain improved fly spray compositions which are more stable to heat and light and have a greater paralyzing effect and greater lethal effect on insects than do the original extract-containing compositions. By employing these synthetic ether compounds to fortify such known ether compositions, economies are effected both in increased efficiency and by reducing the amount of pyrethrin or rotenone required.

When the aryloxy-polyalkylene ether iodides are used alone, a concentration of from about 2 to 10 per cent by weight in the spray composition is satisfactory. For use in stabilizing and/or fortifying common spray compositions comprising pyrethrin or rotenone, the ether compound is preferably employed in amount of from about 0.5 to 5 grams per 100 milliliters of the spray solution. The term "aryl" as herein employed refers to aromatic radicals of the benzene and naphthalene series as obtained by the removal of the hydroxyl grouping of phenol and naphthol and analogues and homologues thereof which may contain such inert substituents as chlorine, bromine, iodine, alkyl, aryl, aralkyl, cycloalkyl, alkoxy, and the like.

The ethers we have found valuable as insecticidal toxicants and stabilizers in spray compositions are those having the following formula:

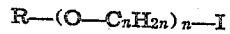

$$R-(O-C_nH_{2n})_n-I$$

wherein R represents an aromatic radical and $n$ is an integer from 2 to 5, inclusive. These compounds are for the most part water-insoluble, substantially odorless, viscous liquids having high specific gravities. Some of the compounds tend to crystallize on standing. Solutions thereof are substantially non-irritating in the concentrations employed, and do not appear to cause dermatitis on contact with the skin.

The aryloxy-polyalkylene ether iodides are prepared by reacting sodium iodide with the corresponding aryloxy-polyalkylene ether chlorides. In carrying out this reaction substantially equimolecular proportions of sodium iodide and the ether chloride are mixed together in an organic solvent, such as methyl-ethyl ketone, and the reaction mixture thereafter heated to a refluxing temperature for a period of time sufficient to accomplish the reaction. Sodium chloride is formed as a by-product and may be removed by washing the mixture with water. The resulting solution of aryloxy-polyalkylene ether iodide is fractionally distilled, whereby the desired ether iodide derivative is obtained in substantially pure form. The preparation and properties of a number of the chloro-ether compounds from which the corresponding iodo derivatives are prepared are described in co-pending applications, Serial Nos. 225,414, 225,415, and 225,416, filed August 17, 1938, and Serial No. 287,624, filed July 31, 1939.

The method employed in determining the insecticidal toxicity of the spray compositions comprising the above compounds is substantially that described in Soap 8, No. 4, 1932 and known as the Peet-Grady method. For purpose of comparison in the examples, the control pyrethrin solution was employed consisting of the extract of the toxic principle from one pound of pyrethrum flowers dissolved in one U. S. gallon of the petroleum distillate having a boiling range of 345°–508° F. and a flash point of 137° F.

The invention is illustrated by the following examples:

Example 1

2.5 grams of beta-(4-chloro-phenoxy)-beta'-(2-iodo-ethoxy)-diethyl ether (boiling at 185°–190° C. at 2 millimeters pressure and having a specific gravity of 1.549 at 20°/4° C.) was dissolved in 100 milliliters of the petroleum distillate as employed in the control solution. This solution was thereafter employed as a spray composition against three-day old houseflies according to the Peet-Grady method and found to give a knockdown of 98 per cent in 10 minutes. In a comparative determination employing the control solution, 100 per cent of the flies were knocked down in 10 minutes. The solution comprising the iodo-ether compound did not show decomposition or deterioration on exposure to air and light, and when sprayed in the testing chamber was substantially non-irritating to the nose and eyes.

*Example 2*

In a similar manner, tests were carried out with spray compositions comprising other aryloxy-polyalkylene ether iodides. These compositions were found to give satisfactory knockdowns and kills, to be stable, and to be substantially non-irritating to humans. For example, 2.5 grams of beta-(2-cyclohexyl-phenoxy)-beta'-iodo-diethyl ether (boiling at 180°–185° C. at 2 millimeters pressure and having a specific gravity of 1.351 at 20°/4° C.) was dissolved in the petroleum distillate described in the preceding example and found to give a knockdown of 72 per cent in 10 minutes and a kill of 40 per cent in 48 hours according to the Peet-Grady method. A more concentrated solution of the same compound containing approximately 3.5 grams per 100 milliliters gave a knockdown of 88 per cent and a kill of 65 per cent in 48 hours. Beta-(4-chloro-phenoxy)-beta'-iodo-diethyl ether (boiling at 177°–179° C. at 2 millimeters pressure and having a specific gravity of 1.627 at 20°/4° C.) and beta-phenoxy-beta'-iodo-diethyl ether (boiling at 160°–162° C. at 6 millimeters pressure and having the specific gravity of 1.563 at 20°/4° C.) were similarly tested at 2.5 grams per 100 milliliters of spray solution and found to give knockdowns of 90 and 98 per cent and kills of 50 and 53 per cent in 48 hours, respectively.

*Example 3*

Mothproofing tests were carried out with solutions of the aryloxy-polyalkylene ether iodides in various organic solvents to determine their efficiency against the larvae of the black carpet beetle (*Attagenus Piceus*). This insect and its larvae attack woolens, furs, and other materials, and are particularly destructive to fabrics used in upholstered furniture, carpets, and rugs. A representative result was obtained with beta-(2,4,6-trichloro-phenoxy)-beta'-iodo-diethyl ether (boiling at 182°–183° C. at 2 millimeters pressure and having a specific gravity of 1.739 at 20°/4° C.). A number of samples of white wool cloth were saturated with a 3 per cent solution of this compound in methyl-ethyl ketone, thereafter pressed to remove excess treating solution, and dried. On each of a number of these samples, five larvae of the black carpet beetle were placed and the sample folded over the larvae. These infested cloth samples were placed in a closed cardboard box and examined from time to time to determine the amount of feeding or other attack directly attributable to the beetle larvae. Similar tests were simultaneously carried out on untreated samples of the woolen cloth, both control and test samples being incubated after infestation at temperatures of 85°–90° F. and at a relative humidity of 70–75 per cent. Examination of incubated samples impregnated with the ether iodide solution showed that after 3 weeks there had been no feeding by the larvae and that 80 per cent of the test larvae were dead. The untreated controls showed heavy feeding throughout the incubation period with a 100 per cent survival of the test larvae. Tests carried out over the same period upon cloth impregnated with methyl-ethyl ketone alone showed feeding by the larvae throughout the incubation period. The material treated with the mothproofing solution was not stained by the initial treatment, had no odor attributable to the toxicant, and showed no tendency to develop discoloration on standing over an extended period of time.

Other aryloxy-ether iodides may be substituted for those shown in the examples. The compounds which are so adapted may be classified in subgeneric groups as follows:

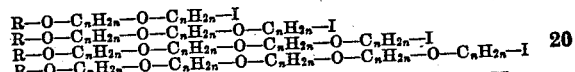

In the foregoing formulas, the group $-O-C_nH_{2n}-$ may represent such oxy-alkylene radicals as

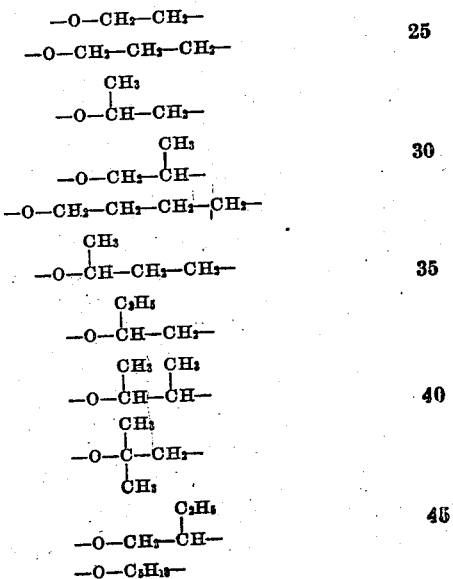

The aryl group R represents such aromatic radicals as those derived from phenol, naphthol, tetrahydro-naphthol, and nuclear substitution products thereof containing one or more phenyl, chlorophenyl, methylphenyl, cyclopentyl, cyclohexyl, methyl-cyclohexyl, methyl, isopropyl, tertiary-hexyl, tertiarybutyl, tertiaryamyl, normal-hexyl, tertiary-octyl, octadecanyl, benzyl, phenylethyl, 4-bromophenyl, propyl, phenyl-normal-hexyl, methoxy, tertiary-butoxy, carbethoxy, chlorine, bromine, iodine, and nitro radicals, or the like. These substituents may be attached to the aromatic nucleus in the ortho-, meta-, or para- position with respect to the hydroxyl grouping.

Likewise, the aryloxy-polyalkylene ether iodides may be employed to fortify and stabilize extracts of pyrethrum flowers, derris, cubé, timbo, barbasco, and the like. Besides petroleum distillates, other organic solvents, such as benzene, ethylene chloride, hydrogenated naphthalene, butyl alcohol, ketones, etc., may be employed. The phrase "non-corrosive organic solvent" as employed in the following claims refers to any organic solvent material unreactive with, and capable of, dissolving the toxicants described, and non-injurious to the skin and general health of humans.

In certain instances it may be desirable to employ the aryloxy ether iodides as toxicants in emulsions or as simple water dispersions along with soap or other wetting, emulsifying, or detergent agents and water. Various perfumes or coloring agents may also be incorporated into such compositions where required.

Other modes of applying the principle of our invention may be employed instead of those explained, change being made as regards the materials or the amounts thereof employed, provided the compositions defined by any of the following claims or their equivalent be employed.

We therefore particularly point out and distinctly claim as our invention:

1. A liquid insecticidal composition having dispersed therein as an active toxicant an aryloxy-polyalkylene ether iodide having the formula $$R-(O-C_nH_{2n})_n-I$$

wherein R represents an aromatic radical and $n$ is an integer from 2 to 5, inclusive.

2. An insecticidal spray comprising a non-corrosive organic solvent having dissolved therein as the principal toxic ingredient an aryloxy-polyalkylene ether iodide having the formula $$R-(O-C_nH_{2n})_n-I$$

wherein R represents an aromatic radical and $n$ is an integer from 2 to 5, inclusive.

3. A substantially water-free household spray composition comprising a petroleum distillate solvent having dissolved therein as an active toxicant an aryloxy-polyalkylene ether iodide having the formula $$R-(O-C_nH_{2n})_n-I$$

wherein R represents an aromatic radical and $n$ is an integer from 2 to 5, inclusive.

4. A liquid insecticidal composition having dispersed therein as an active toxicant an aryloxy ether iodide having the formula $$R-O-C_nH_{2n}-O-C_nH_{2n}-I$$

wherein R represents an aromatic radical and $n$ is an integer from 2 to 5, inclusive.

5. An insecticidal spray comprising a non-corrosive organic solvent having dissolved therein as the principal toxic ingredient a compound having the formula $$R-O-C_nH_{2n}-O-C_nH_{2n}-I$$

wherein R represents an aromatic radical and $n$ is an integer from 2 to 5, inclusive.

6. A substantially water-free household spray composition comprising a petroleum distillate solvent having dissolved therein as an active toxicant an aryloxy-polyalkylene ether iodide having the formula $$R-O-C_nH_{2n}-O-C_nH_{2n}-I$$

wherein R represents an aromatic radical and $n$ is an integer from 2 to 5, inclusive.

7. A liquid insecticidal composition having dispersed therein as an active toxicant an aryloxy ether iodide having the formula $$R-O-CH_2CH_2-O-CH_2CH_2-I$$

wherein R represents an aromatic radical.

8. An insecticidal spray comprising a non-corrosive organic solvent having dissolved therein as the principal toxic ingredient a compound having the formula $$R-O-CH_2CH_2-O-CH_2CH_2-I$$

wherein R represents an aromatic radical.

9. A substantially water-free household spray composition comprising a petroleum distillate solvent having dissolved therein as an active toxicant an aryloxy-ethoxy ethyl iodide having the formula $$R-O-CH_2CH_2-O-CH_2CH_2-I$$

wherein R represents an aromatic radical.

EDGAR C. BRITTON.
GERALD H. COLEMAN.
JOHN W. ZEMBA.